United States Patent [19]
Kaneko

[11] Patent Number: 5,348,247
[45] Date of Patent: Sep. 20, 1994

[54] BRAKING APPARATUS FOR FISHING REEL
[75] Inventor: Kyoichi Kaneko, Tokyo, Japan
[73] Assignee: Daiwa Seiko, Inc., Tokyo, Japan
[21] Appl. No.: 983,738
[22] Filed: Dec. 1, 1992
[30] Foreign Application Priority Data
Dec. 12, 1991 [JP] Japan .............. 3-109481[U]
[51] Int. Cl.⁵ .......................................... A01K 89/033
[52] U.S. Cl. ................................................... 242/303
[58] Field of Search ............... 242/295, 298, 302, 303, 242/304

[56] References Cited
U.S. PATENT DOCUMENTS

| 3,184,179 | 5/1965 | Wood, Jr. | 242/298 X |
| 3,425,644 | 2/1969 | Griste | 242/298 |
| 3,478,979 | 11/1969 | Henze | 242/298 X |
| 4,422,600 | 12/1983 | Preston | 242/298 X |
| 4,516,741 | 5/1985 | Hashimoto | 242/298 X |
| 4,901,944 | 2/1990 | Aoki | 242/260 |

FOREIGN PATENT DOCUMENTS
57-18364  1/1982  Japan .
62-157367 10/1987 Japan .

Primary Examiner—Daniel P. Stodola
Assistant Examiner—Michael R. Mansen
Attorney, Agent, or Firm—Longacre & White

[57] ABSTRACT

A braking apparatus for a double bearing type fishing reel, including a braking force adjusting lever turnably arranged on one of side plates for adjusting a braking force applied to a spool rotatably supported between both the side plates, the braking apparatus further including: an arc-shaped defining member turnably arranged on the one side plate, the defining member having a first engaging portion adapted to be engaged with the braking force adjusting lever for regulating the turnable movement of the braking force adjusting lever relative to the one side plate and defining a maximum braking force applied to the spool. The arc-shaped defining member is adjustingly turned and thereafter fixed onto the one side plate by utilizing a fixing screw. A stepless normal working range with a maximum braking force position suitable for fishing conditions can be provided for the turnable movement of the braking force adjusting lever.

9 Claims, 3 Drawing Sheets

BRAKING APPARATUS FOR FISHING REEL

BACKGROUND OF THE INVENTION

The present invention relates generally to an apparatus for braking a spool provided in a double bearing type fishing reel. More particularly, the present invention relates to improvement for the foregoing type apparatus which includes a mechanism for varying the working range of a braking force adjusting lever used to adjust a drag force applied to a spool of a double bearing type fishing reel.

The Japanese Utility Model Unexamined Publication No. Sho. 62-157367 discloses a conventional double bearing type fishing reel in which the working range of turnable movement of the braking force adjusting lever can be selectively varied depending on the kind of objective fish, the kind of fishing line, the kind of fishing rod and various associated fishing conditions.

With the aforementioned conventional reel, however, since a plurality of position determining pieces each for defining the range of turnable movement of the braking force adjusting lever are telescopically arranged around the outer periphery of the reel, the same number of receiving portions as that of the position determining pieces are required, resulting in that the reel becomes unavoidably complicated in structure due to increase of the number of components constituting the reel, and an operation for assembling the components is troublesome and time-consuming. Since the stepwise adjustment is only achieved for the range of turnable movement of the braking force adjusting lever with the arrangement of the above-noted reel, it is practically impossible to finely and continuously adjust or vary the foregoing range. Another problem is that foreign materials such as salty material, sand, dust or the like readily enter in and adhere to the recessed receiving portions accommodating the respective position determining pieces, causing the braking force adjusting lever to become unreliably adjustable within a long period of practical use.

SUMMARY OF THE INVENTION

The present invention has been made in consideration of the foregoing background.

An object of the present invention is to provide a braking apparatus for a double bearing type fishing reel wherein a normal maximum braking range of turnable movement of a braking force adjusting lever can continuously and steplessly be varied or adjusted corresponding to the present fishing conditions such as the kind of objective fish, the kind of fishing line, the kind of fishing rod or the like.

In order to attain the above-noted and other objects, the present invention provides a braking apparatus for a double bearing type fishing reel, including a braking force adjusting lever turnably arranged on one of side plates for adjusting a braking force applied to a spool rotatably supported between both the side plates, the braking apparatus comprising: an arc-shaped defining member turnably arranged on the one side plate, the defining member having a first engaging portion adapted to be engaged with the braking force adjusting lever for regulating the turnable movement of the braking force adjusting lever relative to the one side plate and defining a first maximum braking force applied to the spool; and means for adjustably fixing the arc-shaped defining member onto the one side plate.

The braking apparatus may further comprise a first defining piece fixedly secured to the one side plate, the first defining piece having a second engaging portion adapted to be engaged with the braking force adjusting lever for defining a minimum braking force applied to the spool, the first and second engaging portion adjustably defining a normal working range in the turnable movement of the braking force adjusting lever. The first defining piece may have a third engaging portion adapted to be engaged with the braking force adjusting lever for defining a free position where no braking force is applied to the spool.

The braking apparatus may further comprise a second defining piece fixedly secured to the one side plate, the second defining piece having a fourth engaging portion adapted to be engaged with the braking force adjusting lever for defining a second maximum braking force, the second maximum braking force being greater than the first maximum braking force. Alternatively, the arc-shaped defining member may have a fourth engaging portion adapted to be engaged with the braking force adjusting lever for defining a second maximum braking force, the second maximum braking force being greater than the first maximum braking force.

The adjustably fixing means preferably includes an elongated hole formed through the defining member, and a fixing screw received in the elongated hole for threadingly fixing the defining member onto the one side plate.

The braking force adjusting lever preferably include means for selectively allowing the braking force adjusting lever to be turnably moved to the third and forth engaging portions beyond the second and first engaging portions, respectively.

With the arrangement according to the present invention, the normal working range of the braking force adjusting lever can be adjustably set by the arc-shaped defining member corresponding to the fishing conditions such as the kinds of the objective fish, the fishing line, the rod and the device provided on the tip end of the fishing line. During fishing, the braking force adjusting lever can be continuously and steplessly turned in the normal working range between first and second engaging positions to provide a suitable braking force.

Other objects, features and advantages of the present invention will become apparent from reading of the following drawings which illustrate preferred embodiments thereof.

BRIEF DESCRIPTION OF THE DRAWINGS

The present invention is illustrated in the following drawings in which.

DESCRIPTION OF THE PREFERRED EMBODIMENTS

The present invention will now be described in detail hereinafter with reference to the accompanying drawings which illustrate preferred embodiments thereof.

Figure 2:
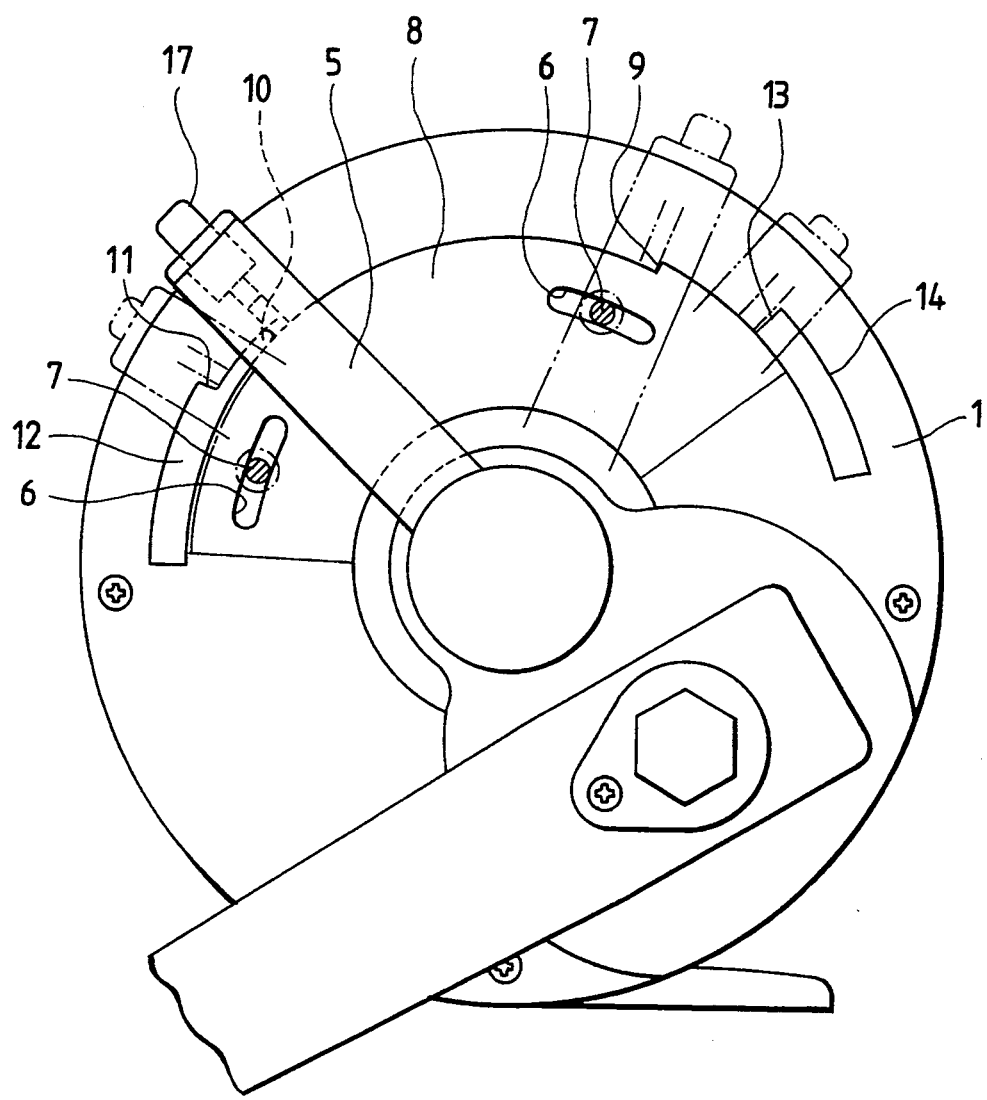
FIG. 2 is a side view of the apparatus shown in FIG. 1, particularly illustrating essential component constituting the apparatus
Figure 3:
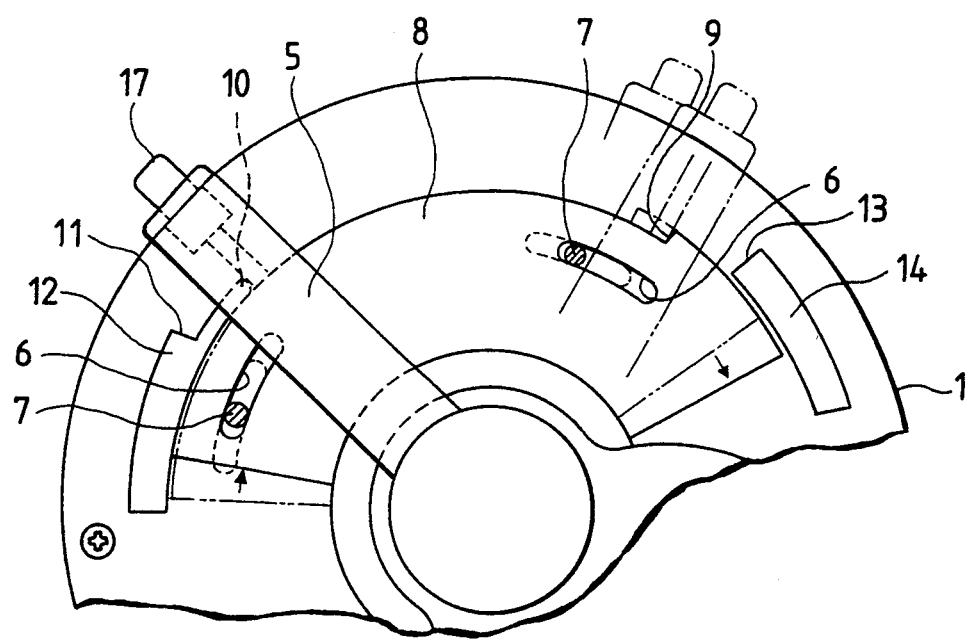
FIG. 3 is a side view of the apparatus shown in FIG. 1, particularly showing the positions of the essential components after completion of adjustment.

First, an apparatus for braking a double bearing type fishing reel in accordance with a first embodiment of the present invention will be described below with reference to FIG. 1 to FIG. 3.

A spool 4 rotatably supported by a support shaft 3 is operatively maintained between both side plates 1 and 2. The spool 4 is braked by a conventional spool braking mechanism. The braking force of the spool braking mechanism, which is applied to the spool 4 can be adjusted by turnably actuating a braking force adjusting lever 5 arranged outside of the side plate 1 on the support shaft 3.

An arc-shaped defining member 8 is arranged on the outer side surface of the side plate 1 to adjustably turn about the support shaft 3. Two arc-shaped elongated holes 6 are formed through the defining member 8 so as to allow fixing screws 7 to be loosely received therethrough for the purpose of fixing the defining member 8 to the side plate 1 by tightening the fixing screws 7. A first engaging portion 9 for defining a maximum end of a normal working range of turnable movement of the braking force adjusting lever 5 is formed at the position in the vicinity of the right-hand end of the outer peripheral edge of the defining member 8. A second engaging portion 10 for regulating the turnable movement of the lever 5 to produce a minimum braking force, and a third engaging portion 11 for positioning the lever 5 to put the spool 1 in a free position, are formed on a defining piece 12 located at the left-hand side of the defining member 8. A fourth engaging portion 13 for positioning the braking force adjusting lever 5 to produce a maximum braking force is formed on a defining piece 14 disposed at the right-hand side of the defining member 8, as shown in FIG. 2. These defining pieces 12 and 14 and side plate 1 may be formed as a single integral member, or otherwise may be separately formed and integrated together.

Referring to FIG. 1 again, a slidable contact piece 16 adapted to come in slidable contact with the arc-shaped outer peripheral surface of the defining member 8 by the action of a coil spring 15 is turnably supported on the braking force adjusting lever 5, and moreover, an actuating piece 17 for depressing the slidable contact piece 16 against the resilient force of the coil spring 15 is telescopically supported on the braking force adjusting lever 5.

Next, a mode operation of the apparatus constructed in the aforementioned manner will be described below. First, the fixing screws 7 in the elongated holes 6 on the defining member 8 are manually loosened so as to allow the first engaging portion 9 of the defining member 8 to be turnably displaced to the position correctly corresponding to the present fishing conditions, and on completion of the turnable displacement of the defining member 8, the fixing screws 7 are tightened. While the foregoing position is maintained, the braking force adjusting lever 5 can freely turnably displaced to a desired position normally located between the first engaging portion 9 and the second engaging portion 10 to perform a drag operation with the desired braking force for the spool 4. When a fishing man wants to keep the spool 4 free or maximize the drag braking force, he depresses the actuating piece 17 against the resilient force of the coil spring 15 to raise up the slidable contact piece 16 from the first engaging portion 9 or the second engaging portion 10, whereby the braking force adjusting lever 5 is brought in engagement with the third engaging portion 11 of the defining piece 12 or the fourth engaging portion 13 of the defining piece 14.

Figure 4:
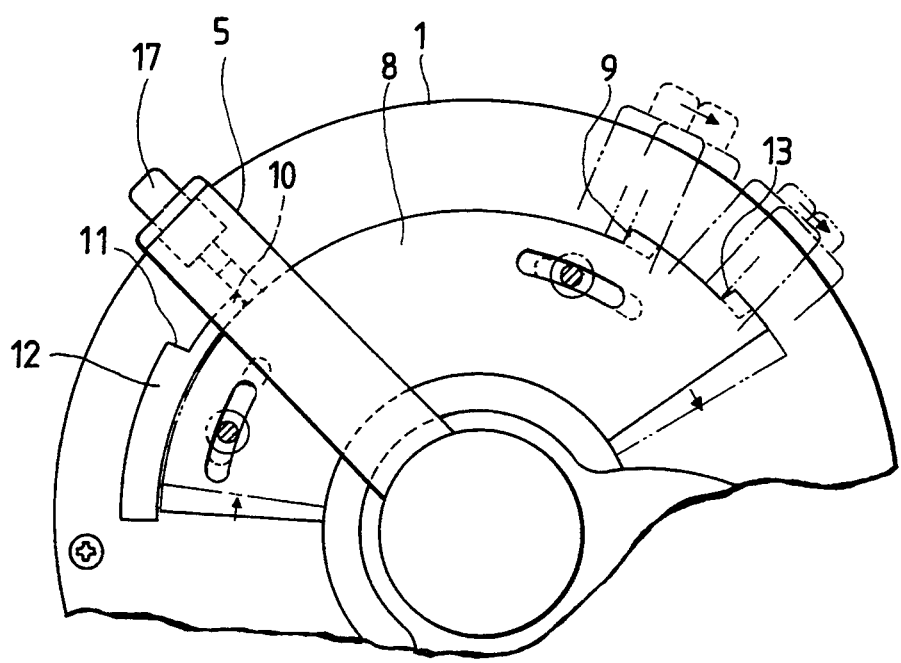
FIG. 4 is a side view of an apparatus for braking a double bearing type fishing reel in accordance with a second embodiment of the present invention.

Next, an apparatus for braking a double bearing type fishing reel in accordance with a second embodiment of the present invention will be described below with reference to FIG. 4. In this embodiment, the apparatus is modified from the apparatus shown in FIG. 1 to FIG. 3 in such a manner that a fourth engaging portion 13 for defining a maximum braking force is formed integral with a defining member 8 so that the fourth engaging portion 13 is displaced together with a first engaging portion 9 when the defining member 8 is selectively turnably displaced.

Figure 1:
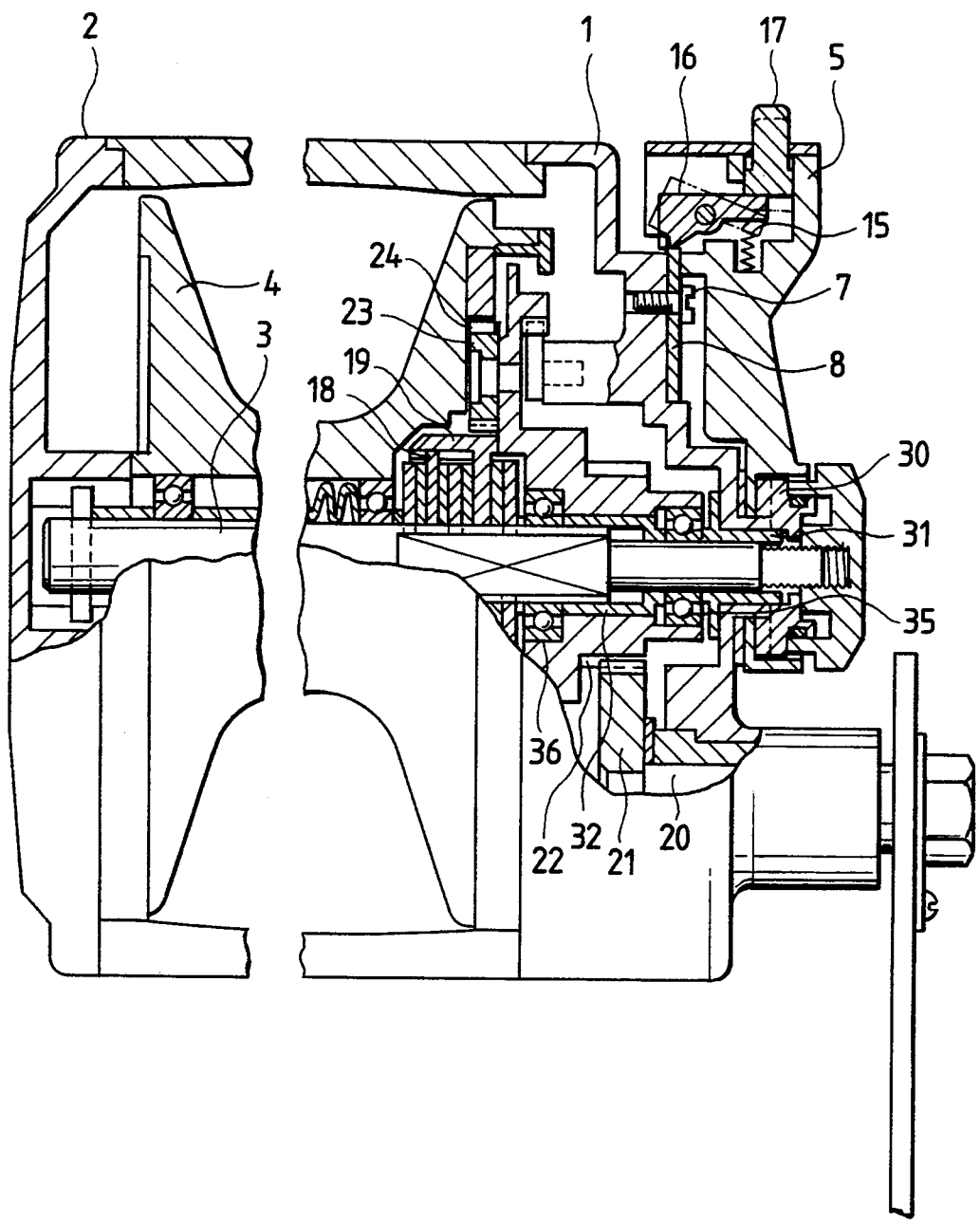
FIG. 1 is a partially exploded front view of an apparatus for braking a double bearing type fishing reel in accordance with a first embodiment of the present invention.

Although a spool braking mechanism does not form a part of the present invention, it is constructed in the embodiment shown in FIG. 1 such that a gear 19 to be braked by a braking member 18 is rotatably supported by the spool support shaft 3, and the spool 4 is operatively connected to a pinion 22, which is adapted to be rotated by a driving gear 21 fixedly mounted on a handle shaft 20, via a planetary gear mechanism including planet gears 23 and an internal gear 24 while the braking gear 19 serves as a sun gear. By turning the lever 5 relative to the side plate 1, the mutual depression on the braking member 18 is increased or decreased through members 30, 31 and 32 and bearings 35 and 36 to adjust or vary a drag force applied onto the spool 4. In addition, although a planetary gear type spool braking mechanism is described as an example, the present invention can be applied to various kinds of conventional spool braking mechanisms, for example, as disclosed in Japanese Utility Model Unexamined Publication No. Sho. 57-18364.

As is apparent from the above description, with the apparatus constructed in the aforementioned manner, a maximum drag braking force correctly corresponding to the kind of objective fish, the kind of fishing line, the kind of fishing rod and various associated fishing conditions can selectively be utilized merely by turnably arranging a defining member including engaging portions for defining a normal maximum braking force adjacent to one of side plates for a reel and then fixing it. Especially, positions of the respective engaging portions to be assumed by the latter can steplessly and continuously be adjusted by turning the defining member in contrast with the conventional apparatus wherein they are stepwise adjusted. Consequently, a drag braking force can finely be adjusted with the apparatus of the present invention.

While the present invention has been described above merely with respect to two preferred embodiments thereof, it should of course be understood that the present invention should not be limited only to these embodiments but various change or modification may be made without departure from the scope of the present invention as defined by the appended claims.

What is claimed is:

1. A braking apparatus for a double bearing type fishing reel having two side plates, including a braking force adjusting lever turnably arranged on one of said side plates for adjusting a braking force applied to a spool rotatably supported between both said side plates, said braking apparatus comprising:

an arc-shaped defining member slidably arranged on said one side plate, said defining member having a first engaging portion engaging said braking force adjusting lever for regulating the turnable movement of said braking force adjusting lever relative to said one side plate, thereby defining a first braking force applied to said spool;

said braking force adjusting lever including means for contiguously engaging said arc-shaped defining member, said means for contiguously engaging is relatively movable with respect to said braking force adjusting lever; and means for adjustably fixing said arc-shaped defining member onto said one side plate to selectively vary the location of said first engaging portion.

2. The braking apparatus according to claim 1, further comprising:

a first defining piece fixedly secured to said one side plate, said first defining piece having a second engaging portion adapted to be engaged with said braking force adjusting lever for defining a second braking force applied to said spool, said first and second engaging portion adjustably defining a normal working range in the turnable movement of said braking force adjusting lever.

3. The braking apparatus according to claim 2, wherein said first defining piece has a third engaging portion adapted to be engaged with said braking force adjusting lever for defining a third position where no braking force is applied to said spool.

4. The braking apparatus according to claim 3, wherein said contiguously engaging means selectively allows said braking force adjusting lever to be turnably moved to said third engaging position beyond said second engaging portion.

5. The braking apparatus according to claim 2, further comprising:

a second defining piece fixedly secured to said one side plate, said second defining piece having a fourth engaging portion adapted to be engaged with said braking force adjusting lever for defining a fourth braking force, said fourth braking force being greater than said first braking force.

6. The braking apparatus according to claim 5, wherein said contiguously engaging means selectively allows said braking force adjusting lever to be turnably moved to said fourth engaging position beyond said first engaging portion.

7. The braking apparatus according to claim 2, wherein said arc-shaped defining member has a fourth engaging portion adapted to be engaged with said braking force adjusting lever for defining a fourth braking force, said fourth braking force being greater than said first braking force.

8. The braking apparatus according to claim 1, wherein said adjustably fixing means includes an elongated hole and a fixing screw received in said elongated hole for threadingly fixing said defining member onto said one side plate.

9. A braking apparatus for a double bearing type fishing reel having two side plates and a spool rotatably supported between said side plates, said braking apparatus comprising:

a braking force adjusting lever pivotally mounted with respect to one of said side plates for adjusting a braking force applied to the spool;

a first defining piece having a first engaging portion defining a first position for obtaining a first braking force applied to the spool, said first defining piece is relatively fixed with respect to said one side plate;

an arc-shaped defining member having a second engaging portion defining a second position for obtaining a second braking force applied to said spool, said defining member is slidably mounted on said one side plate; and, securing means for locating said arc-shaped defining member with respect to said one side plate;

wherein a continuously variable braking force range is established by displacing said second engaging portion relative to said first engaging portion.

* * * * *